United States Patent
Raison et al.

(10) Patent No.: US 11,757,833 B2
(45) Date of Patent: Sep. 12, 2023

(54) NETWORK DEVICE INTERFACE FOR SUPPORTING CENTRALIZED ADDRESS POOL MANAGEMENT

(71) Applicant: Juniper Networks, Inc., Sunnyvale, CA (US)

(72) Inventors: Paul Raison, Windham, NH (US); Jonathan Azevedo, Watertown, MA (US); Steven P. Onishi, Groton, MA (US); Linda M. Cabeca, Waltham, MA (US); Michael D. Carr, Riverside, RI (US)

(73) Assignee: Juniper Networks, Inc., Sunnyvale, CA (US)

( * ) Notice: Subject to any disclaimer, the term of this patent is extended or adjusted under 35 U.S.C. 154(b) by 50 days.

(21) Appl. No.: 17/449,320

(22) Filed: Sep. 29, 2021

(65) Prior Publication Data
US 2023/0098182 A1    Mar. 30, 2023

(51) Int. Cl.
H04L 61/5061    (2022.01)
H04L 61/5007    (2022.01)

(52) U.S. Cl.
CPC ...... H04L 61/5061 (2022.05); H04L 61/5007 (2022.05)

(58) Field of Classification Search
CPC . H04L 41/08; H04L 41/0803; H04L 41/0806; H04L 41/0813; H04L 41/0816;
(Continued)

(56) References Cited

U.S. PATENT DOCUMENTS

| 6,988,148 B1 * | 1/2006 | Sheth | H04L 61/5061 709/245 |
| 7,197,549 B1 * | 3/2007 | Salama | H04L 61/5061 710/4 |

(Continued)

FOREIGN PATENT DOCUMENTS

| CN | 106130843 A | * 11/2016 | ......... H04L 61/2007 |
| CN | 106230980 A | * 12/2016 | ......... H04L 61/5007 |

(Continued)

OTHER PUBLICATIONS

Xie, Chongfeng, et al. "ARPIM: IP address resource pooling and intelligent management system for broadband IP networks." IEEE Communications Magazine 55.6 (2017): 55-61. (Year: 2017).*

(Continued)

*Primary Examiner* — Vivek Srivastava
*Assistant Examiner* — William C Mcbeth
(74) *Attorney, Agent, or Firm* — Harrity & Harrity, LLP

(57) ABSTRACT

A first device may establish a connection with a second device, and may provide a connection check RPC message to the second device. The first device may receive a verification RPC message from the second device, and may provide, to the second device, a sync domains RPC request that includes a first list of active domains with associated address pools. The first device may receive, from the second device, a sync domains RPC response that includes threshold values for the active domains included in the first list of active domains, and may provide, to the second device, a sync pools RPC request that includes a first list of address pools associated with the active domains. The first device may receive, from the second device, a sync pools RPC response that includes confirmation of the first list of address pools, and may allocate addresses of an address pool to a CPE.

20 Claims, 10 Drawing Sheets

(58) Field of Classification Search
CPC ............ H04L 41/0866; H04L 41/0869; H04L 41/0886; H04L 41/0889; H04L 61/50; H04L 61/5007; H04L 61/5014; H04L 61/503; H04L 61/5061
See application file for complete search history.

(56) References Cited

U.S. PATENT DOCUMENTS

| | | | |
|---|---|---|---|
| 7,788,345 B1* | 8/2010 | Sukiman | H04L 61/5061 709/227 |
| 9,813,374 B1* | 11/2017 | Magerramov | H04L 61/5061 |
| 11,483,282 B1* | 10/2022 | Rubin-Smith | H04L 61/5007 |
| 2007/0180120 A1* | 8/2007 | Bainbridge | H04L 61/5061 709/226 |
| 2008/0101353 A1* | 5/2008 | Streijl | H04L 61/5061 370/389 |
| 2011/0238793 A1* | 9/2011 | Bedare | H04L 61/5061 709/224 |
| 2012/0198096 A1* | 8/2012 | Leng | H04L 61/5061 709/245 |
| 2013/0103836 A1* | 4/2013 | Baniqued | H04L 61/5061 709/226 |
| 2016/0241441 A1* | 8/2016 | Jiang | H04L 41/0813 |
| 2018/0241689 A1* | 8/2018 | Xu | H04L 61/5061 |
| 2019/0238500 A1 | 8/2019 | Xu et al. | |
| 2020/0120408 A1 | 4/2020 | Boyd et al. | |
| 2020/0186494 A1 | 6/2020 | X et al. | |

FOREIGN PATENT DOCUMENTS

| | | | | |
|---|---|---|---|---|
| CN | 107786680 A | * | 3/2018 | ............ H04L 61/30 |
| CN | 107786681 A | * | 3/2018 | ......... H04L 61/2007 |
| CN | 108234681 A | * | 6/2018 | ......... H04L 61/2007 |
| CN | 109428950 A | * | 3/2019 | ......... H04L 61/2007 |
| CN | 112866425 A | * | 5/2021 | ......... H04L 61/5061 |

OTHER PUBLICATIONS

Wikipedia contributors. "NETCONF." Wikipedia, The Free Encyclopedia. Wikipedia, The Free Encyclopedia, Dec. 21, 2021. Web. Jan. 12, 2023. (Year: 2021).*

* cited by examiner

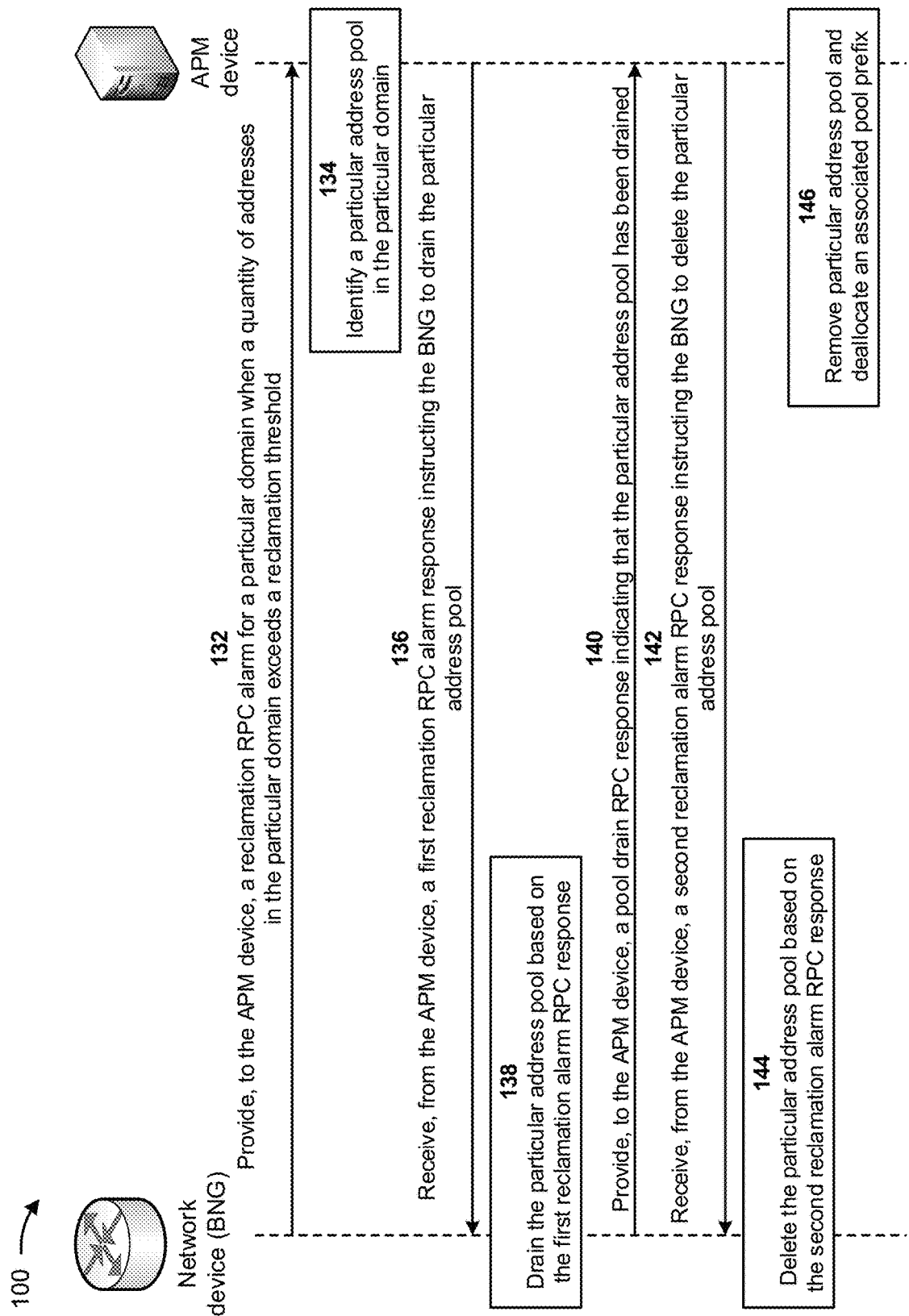

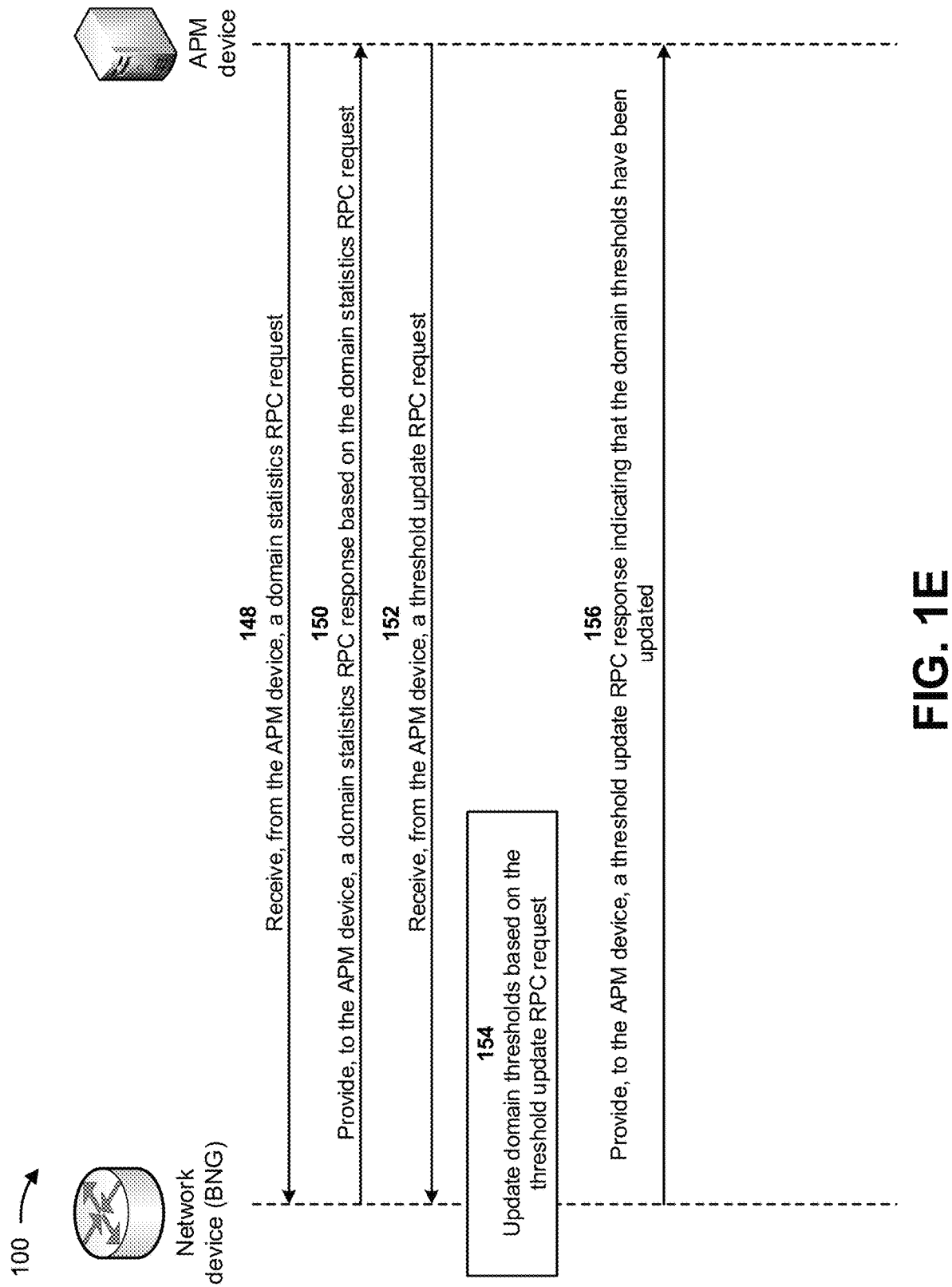

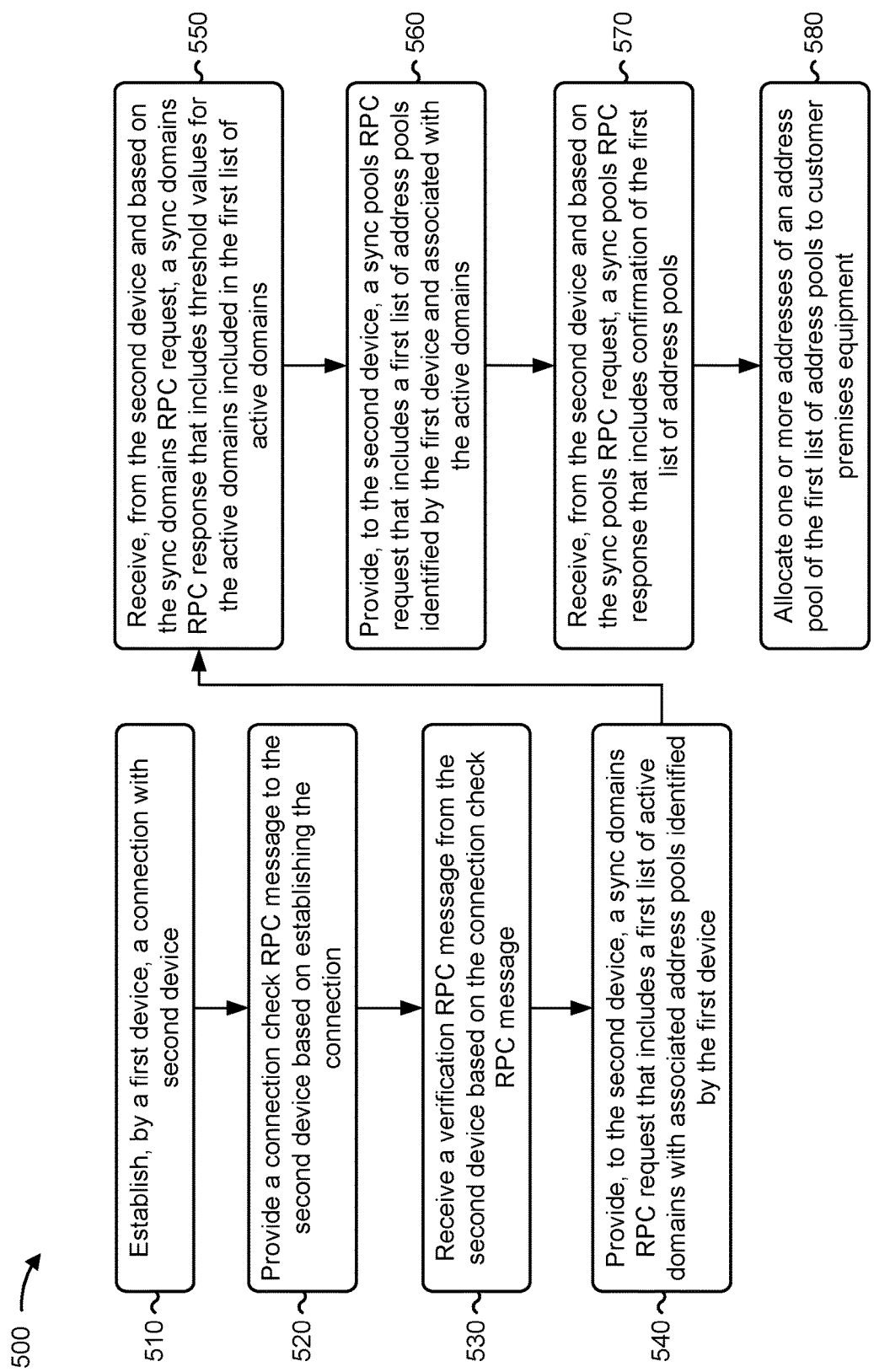

NETWORK DEVICE INTERFACE FOR SUPPORTING CENTRALIZED ADDRESS POOL MANAGEMENT

BACKGROUND

At an edge of a network, service providers are responsible for dynamically assigning public Internet protocol (IP) addresses to customer premises equipment (CPE) in order for customer traffic to be routed to public destinations. As such, service providers must lease IP version 4 (IPv4) address space commensurate with a scale of a customer base. However, the supply of IPv4 addresses is diminishing worldwide.

SUMMARY

Some implementations described herein relate to a method. The method may include establishing, by a first device, a connection with a second device, and providing a connection check remote procedure call (RPC) message to the second device based on establishing the connection. The method may include receiving a verification RPC message from the second device based on the connection check RPC message, and providing, to the second device, a sync domains RPC request that includes a first list of active domains with associated address pools identified by the first device. The method may include receiving, from the second device and based on the sync domains RPC request, a sync domains RPC response that includes threshold values for the active domains included in the first list of active domains, and providing, to the second device, a sync pools RPC request that includes a first list of address pools identified by the first device and associated with the active domains. The method may include receiving, from the second device and based on the sync pools RPC request, a sync pools RPC response that includes confirmation of the first list of address pools, and allocating one or more addresses of an address pool of the first list of address pools to customer premises equipment.

Some implementations described herein relate to a first device. The first device may include one or more memories and one or more processors. The one or more processors may be configured to establish a connection with a second device, and provide a connection check remote procedure call (RPC) message to the second device based on establishing the connection. The one or more processors may be configured to receive a verification RPC message from the second device based on the connection check RPC message, and provide, to the second device, a sync domains RPC request that includes a first list of active domains with associated address pools identified by the first device. The one or more processors may be configured to receive, from the second device and based on the sync domains RPC request, a sync domains RPC response that includes threshold values for the active domains included in the first list of active domains, and provide, to the second device, a sync pools RPC request that includes a first list of address pools identified by the first device and associated with the active domains. The one or more processors may be configured to receive, from the second device and based on the sync pools RPC request, a sync pools RPC response that includes confirmation of the first list of address pools, and provide, to the second device, a domain creation RPC request that includes a partition, a prefix length, and a name for a requested domain. The one or more processors may be configured to receive, from the second device, an RPC response indicating that the requested domain is created and including threshold values for the requested domain.

Some implementations described herein relate to a non-transitory computer-readable medium that stores a set of instructions for a first device. The set of instructions, when executed by one or more processors of the first device, may cause the first device to establish a connection with a second device, and provide a connection check remote procedure call (RPC) message to the second device based on establishing the connection. The set of instructions, when executed by one or more processors of the first device, may cause the first device to receive a verification RPC message from the second device based on the connection check RPC message, and provide, to the second device, a sync domains RPC request that includes a first list of active domains with associated address pools identified by the first device. The set of instructions, when executed by one or more processors of the first device, may cause the first device to receive, from the second device and based on the sync domains RPC request, a sync domains RPC response that includes threshold values for the active domains included in the first list of active domains, and provide, to the second device, a sync pools RPC request that includes a first list of address pools identified by the first device and associated with the active domains. The set of instructions, when executed by one or more processors of the first device, may cause the first device to receive, from the second device and based on the sync pools RPC request, a sync pools RPC response that includes confirmation of the first list of address pools, and allocate one or more addresses of an address pool of the first list of address pools to customer premises equipment.

BRIEF DESCRIPTION OF THE DRAWINGS

FIGS. 1A-1F are diagrams of an example associated with a network device interface for supporting centralized address pool management.

FIG. 5 is a flowchart of an example process for providing a network device interface that supports centralized address pool management.

DETAILED DESCRIPTION

Figure 1A:
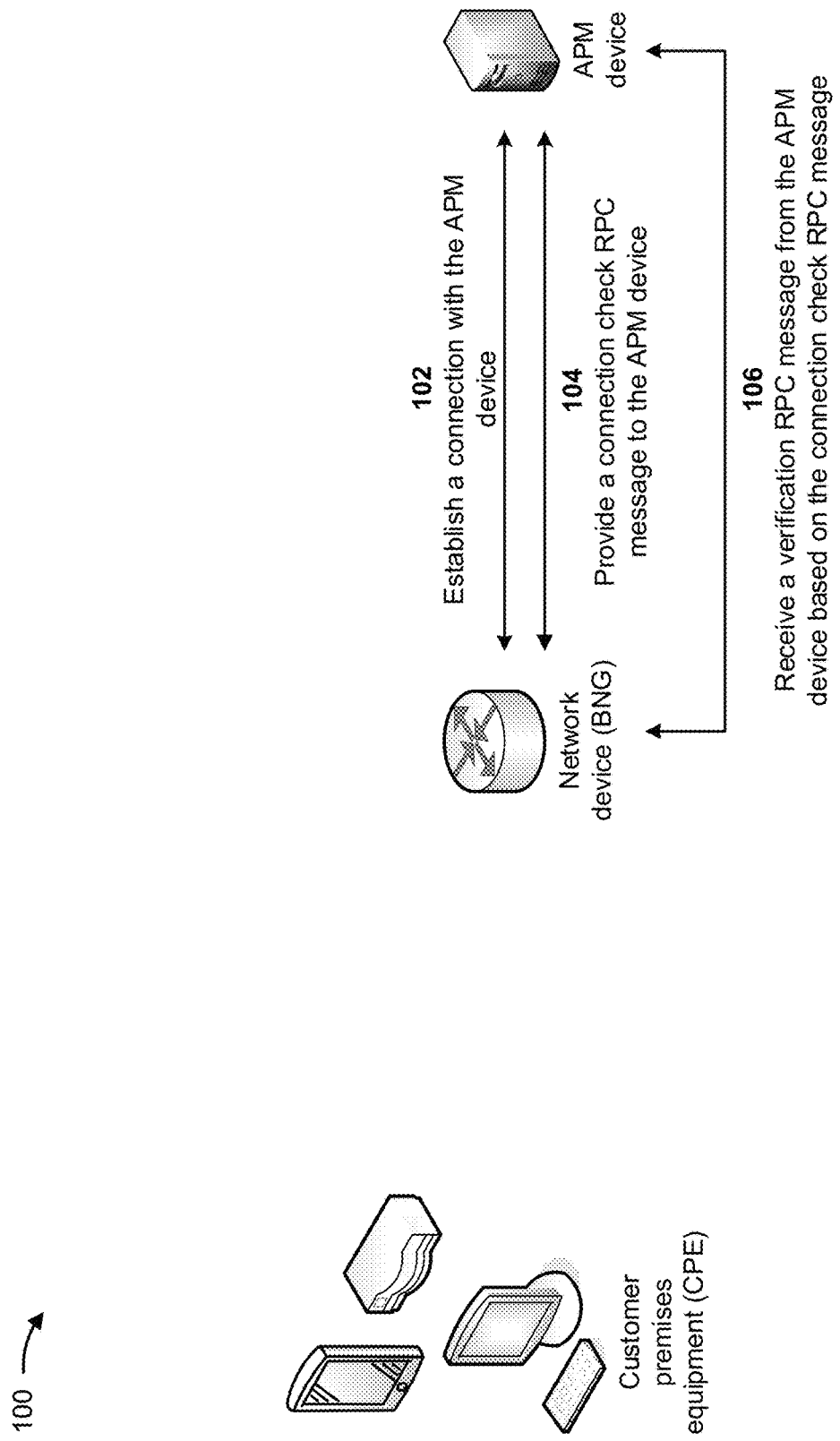

The following detailed description of example implementations refers to the accompanying drawings. The same reference numbers in different drawings may identify the same or similar elements.

Service providers are seeking ways to more efficiently utilize leased IPv4 addresses. One technique for allocating addresses to provider edge devices (e.g., broadband network gateways (BNGs)) is just-in-time provisioning by a centralized address pool management (APM) application. Just-in-time provisioning depends on the provider edge device communicating a state of address pool utilization with the APM application over a configuration interface (e.g., a NETCONF interface). When a quantity of available addresses on the provider edge device is low, the APM application is called upon to add pool prefixes. When a quantity of available addresses on the provider edge device is in surplus, the APM application is called upon to withdraw prefixes so they can be distributed to other provider edge devices.

In order to avoid delays in customer session setup, the APM application must be able to provision a pool prefix on the provider edge device quickly enough to avoid depletion of the address pools. The configuration-based interface is slow (e.g., requiring, ten, twenty, or more seconds to perform provisioning) because of system level consistency checks that are performed by the configuration before pool prefixes are actually provisioned on the provider edge device. The slowness of the configuration interface forces the APM application to provision larger pool prefixes in order to prevent address pool depletion and associated customer session stalls. Larger prefixes also create less efficiency in overall address utilization.

Thus, current techniques for allocating addresses to provider edge devices consume computing resources (e.g., processing resources, memory resources, communication resources, and/or the like), networking resources, and/or the like, are associated with delaying traffic transmission through a network slow address allocation, losing traffic due to slow address allocation, handling lost traffic caused by slow address allocation, preventing traffic transmission by customers, and/or the like.

Some implementations described herein relate to a network device that provides a network device interface for supporting centralized address pool management. For example, a first device may establish a connection with a second device, and may provide a connection check RPC message to the second device based on establishing the connection. The first device may receive a verification RPC message from the second device based on the connection check RPC message, and may provide, to the second device, a sync domains RPC request that includes a first list of active domains with associated address pools identified by the first device. The first device may receive, from the second device and based on the sync domains RPC request, a sync domains RPC response that includes threshold values for the active domains included in the first list of active domains, and may provide, to the second device, a sync pools RPC request that includes a first list of address pools identified by the first device and associated with the active domains. The first device may receive, from the second device and based on the sync pools RPC request, a sync pools RPC response that includes confirmation of the first list of address pools, and may allocate one or more addresses of an address pool of the first list of address pools to customer premises equipment.

In this way, the network device provides a network device interface for supporting centralized address pool management. For example, a network device (e.g., a provider edge device) may include an RPC-based interface that provisions address pool prefixes directly into an address allocator of the network device. The RPC-based interface may enable sub-second provisioning of address pool prefixes for the network device and may subsequently allow a size of an address pool prefix (e.g., in terms of a quantity of host addresses) to be smaller. Once a connection has been established between the network device and an APM device, two phases may be completed before the interface is operational. First, a connection check may be performed by the network device and the APM device to verify identities of the devices and a version of a protocol being utilized by the devices, as well as an indication of whether this is a first time that the devices have connected. Second, a synchronization may be performed by the devices to exchange information identifying pool domains and associated pools and prefixes. The synchronization may ensure that the devices agree on what pool domains exist, domain attributes (e.g., thresholds, preferred prefix length, partition, and/or the like), and what pool prefixes are assumed to be allocated.

Thus, the network device conserves computing resources, networking resources, and/or that like that would otherwise have been consumed by delaying traffic transmission through a network slow address allocation, losing traffic due to slow address allocation, handling lost traffic caused by slow address allocation, preventing traffic transmission by customers, and/or the like.

FIGS. 1A-1F are diagrams of an example 100 associated with a network device interface for supporting centralized address pool management. As shown in FIGS. 1A-1F, example 100 includes customer premises equipment (CPE), a network device, and an APM device. The network device may include a provider edge (PE) device, such as a BNG. The APM device may include a device that provisions the network device with addresses (e.g., Internet protocol (IP) addresses) for utilization by the CPE. The network device may allocate addresses, to the CPE, from address pools. An address pool may include a name and a prefix. Address pools may be grouped into domains, where each domain defines an allocation context. Each domain may include associated parameters supplied by the APM device and/or the network device. For example, the parameters may include a parameter for an apportion threshold (e.g., a threshold of available addresses below which the domain is considered in deficit and in need of additional pool prefixes), a parameter for a reclamation threshold (e.g., a threshold of available addresses above which the domain is considered to be in surplus and in need of withdrawal or removal of pool prefixes), a parameter for a preferred prefix length (e.g., a size of prefixes to add to the domain), a parameter for a source partition (e.g., a source partition guides the APM device from where to allocate pool prefixes), and/or the like. Further details of the CPE, the network device, and the APM device are provided elsewhere herein.

As shown in FIG. 1A, and by reference number 102, the network device and the APM device may establish a connection. For example, the network device may provide a connection request to the APM device, and the connection with the APM device may be established if the APM device accepts the connection request. The connection may be established via a protocol interface (e.g., an APM interface or APMi) between the APM device and the network device. Since the network device may monitor pool utilization and initiate requests for pool replenishment or removal, the protocol interface may define a role of the network device as a client and a role of the APM device as a server. As the client, the network device may be an initiator of the connection and most requests that drive the APM device to perform APM actions. The network device may be configured with connection parameters in order to initiate the connection with the APM device. The APM device may include a configuration profile for the network device so that the connection may be established. In some implementations, the APM device may provide a connection request to the network device, and the connection with the network device may be established if the network device accepts the connection request. In such implementations, the APM device may act as the client and may be an initiator of the connection and most requests that drive the network device to perform actions.

As further shown in FIG. 1A, and by reference number 104, the network device may provide a connection check RPC message to the APM device. For example, once the connection is established, the network device may generate the connection check RPC message and may provide the connection check RPC message to the APM device. The connection check RPC message may include a heartbeat message that verifies that both the network device and the APM device are ready to perform operations. In some implementations, the APM device may provide the connection check RPC message to the network device. For example, once the connection is established, the APM device may generate the connection check RPC message and may provide the connection check RPC message to the network device.

As further shown in FIG. 1A, and by reference number 106, the network device may receive a verification RPC message from the APM device based on the connection check RPC message. For example, when the APM device receives the connection check RPC message, the APM device may verify that the APM device is ready to perform operations. If the APM device is ready to perform operations, the APM device may generate the verification RPC message and may provide the verification RPC message to the network device. The verification RPC message may indicate, to the network device, that the APM device is ready to perform operations. In some implementations, the APM device may receive a verification RPC message from the network device based on the connection check RPC message. For example, when the network device receives the connection check RPC message, the network device may verify that the network device is ready to perform operations. If the network device is ready to perform operations, the network device may generate the verification RPC message and may provide the verification RPC message to the APM device. The verification RPC message may indicate, to the APM device, that the network device is ready to perform operations.

Figure 1B:
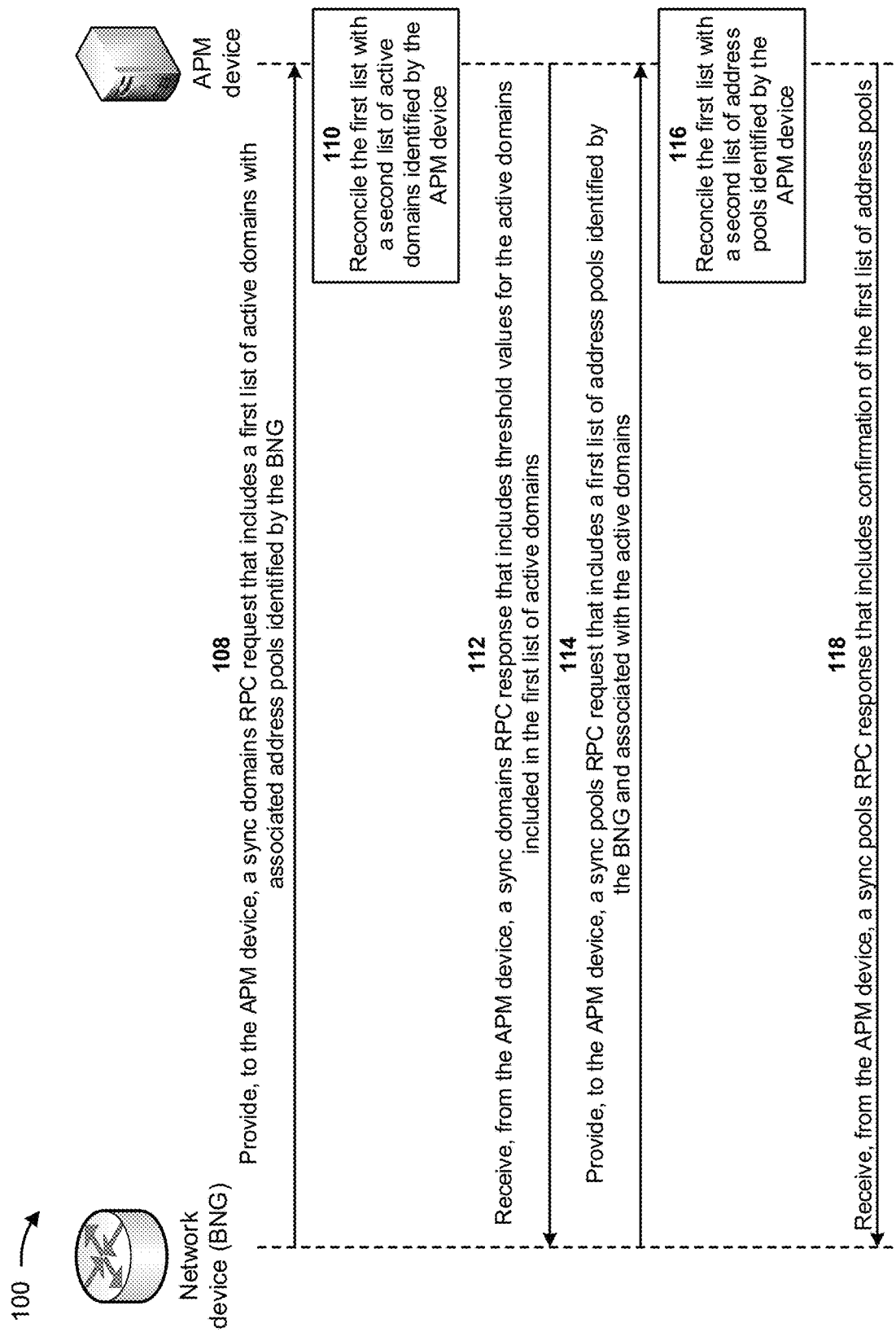

As shown in FIG. 1B, and by reference number 108, the network device may provide, to the APM device, a sync domains RPC request that includes a first list of active domains with associated address pools identified by the network device. For example, the network device may initiate domain synchronization by providing, to the APM device, the sync domains RPC request that includes the first list of active domains with associated address pools identified by the network device. The sync domains RPC request may include a sync domains RPC with a sync domains information message that includes the first list of active domains with associated address pools identified by the network device. In some implementations, the APM device may provide, to the network device, a sync domains RPC request that includes a first list of active domains with associated address pools identified by the APM device. For example, the APM device may initiate domain synchronization by providing the sync domains RPC to the network device.

As further shown in FIG. 1B, and by reference number 110, the APM device may reconcile the first list with a second list of active domains identified by the APM device. For example, the APM device may reconcile the first list by either deleting any domains (e.g., and associated pools) in the second list for the network device that was not provided in the first list or by adding any domains in the first list that APM device has not identified (e.g., are not included in the second list). Effectively, the APM device may ensure that the first list matches the second list. In some implementations, the network device may reconcile the first list with a second list of active domains identified by the network device. For example, the network device may reconcile the first list by either deleting any domains in the second list for the network device that was not provided in the first list or by adding any domains in the first list that network device has not identified.

As further shown in FIG. 1B, and by reference number 112, the network device may receive, from the APM device, a sync domains RPC response that includes threshold values for the active domains included in the first list of active domains. For example, once the first list and the second list are reconciled, the APM device may provide, to the network device, the sync domains RPC response that includes configured threshold values for the domains in the first list, including any domains that were created by the APM device during the reconciliation. In some implementations, if the network device restarts and sends an empty first list, the APM device may delete all domains associated with the network device and may return any allocated prefixes, for the network device, to a partition of origin. In some implementations, the APM device may receive, from the network device, a sync domains RPC response that includes threshold values for the active domains included in the first list of active domains. For example, once the first list and the second list are reconciled, the network device may provide, to the APM device, the sync domains RPC response that includes configured threshold values for the domains in the first list, including any domains that were created by the network device during the reconciliation.

As further shown in FIG. 1B, and by reference number 114, the network device may provide, to the APM device, a sync pools RPC request that includes a first list of address pools identified by the network device and associated with the active domains. For example, for each active domain for which the network received threshold values from the APM device during the domain synchronization, the network device may generate a sync pools RPC request. The sync pools RPC request may include the first list of address pools identified by the network device and associated with the active domains. The network device may provide the sync pools request to the APM device. In some implementations, the APM device may provide, to the network device, a sync pools RPC request that includes a first list of address pools identified by the APM device and associated with the active domains.

As further shown in FIG. 1B, and by reference number 116, the APM device may reconcile the first list of address pools identified by the network device with a second list of address pools identified by the APM device. For example, the APM device may reconcile pool prefixes of the first list of address pools by verifying that each pool prefix is either allocated for the network device and a domain (e.g., included in the second list of address pools) or available for allocation. The APM device may delete any pools and may deallocate prefixes for a domain not included in the first list of address pools but included in the second list of address pools. The APM device may allocate prefixes for pools included in the first list of address pools but not included in the second list of address pools. In some implementations, the network device may reconcile the first list of address pools identified by the APM device with a second list of address pools identified by the network device. For example, the network device may reconcile pool prefixes of the first list of address pools by verifying that each pool prefix is either allocated for the APM device and a domain or available for allocation.

As further shown in FIG. 1B, and by reference number 118, the network device may receive, from the APM device, a sync pools RPC response that includes confirmation of the first list of address pools. For example, once the first list of address pools and the second list of address pools are reconciled, the APM device may provide, to the network device, the sync pools RPC response that includes an indication that the first list of address pools are reconciled with the second list of address pools. In some implementations, if a pool prefix included in the first list address pools cannot be allocated to the network device (e.g., may be allocated to another network device or domain), the APM device may generate a list of pool names with prefixes that could not be allocated to the network device. The APM device may provide, to the network device, the list of pool names with prefixes that could not be allocated to the network device, via the sync pools RPC response. In such situations, the network device may drain and remove the pools included in the list of pool names with prefixes that could not be allocated to the network device. The APM device may also generate a warning message in such situations. If no pools included in the first list of address pools could be guaranteed allocation, the APM device may consider the domain invalid and may delete the domain. The APM device may also generate a warning message.

In some implementations, the APM device may receive, from the network device, a sync pools RPC response that includes confirmation of the first list of address pools. For example, once the first list of address pools and the second list of address pools are reconciled, the network device may provide, to the APM device, the sync pools RPC response that includes an indication that the first list of address pools are reconciled with the second list of address pools.

Figure 1C:
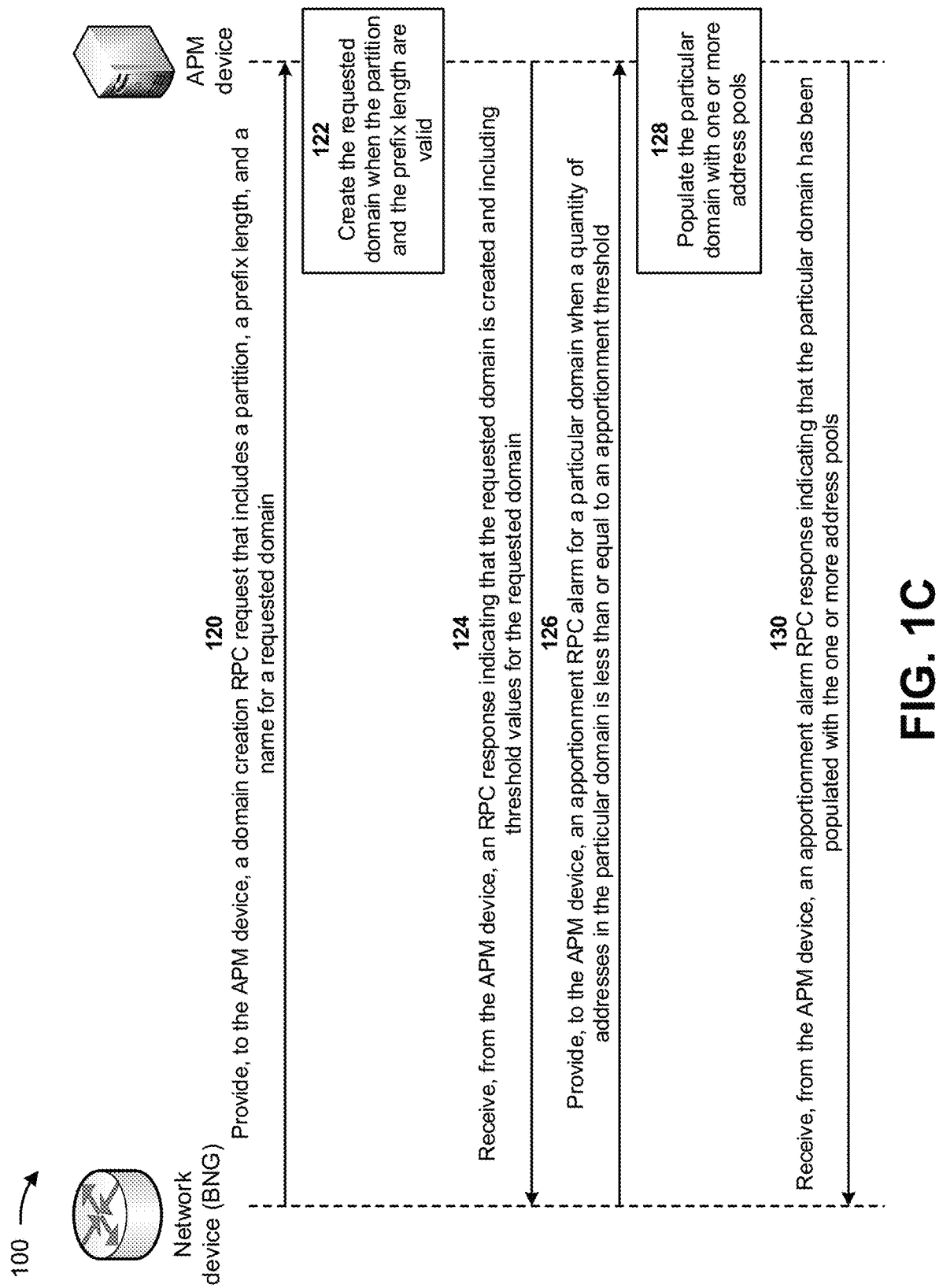

As shown in FIG. 1C, and by reference number 120, the network device may provide, to the APM device, a domain creation RPC request that includes a partition, a prefix length, and a name for a requested domain. For example, if the network device determines to create a domain, the network device may initiate a pool domain creation by generating the domain creation RPC request. The domain creation RPC request may include the partition, the preferred prefix length, and the domain name for the requested domain. The network device may provide the domain creation RPC request to the APM device in order to create the domain. In some implementations, the APM device may provide, to the network device, a domain creation RPC request that includes a partition, a prefix length, and a name for a requested domain.

As further shown in FIG. 1C, and by reference number 122, the APM device may create the requested domain when the partition and the prefix length are valid for the requested domain. For example, the APM device may determine whether the partition and the prefix length for the domain are valid based on comparing the partition and the prefix length to partitions and prefix lengths of domains available for allocation by the APM device. If the partition and the prefix length match one of the partitions and prefix lengths of the domains available for allocation, the APM device may determine that the partition and the prefix length for the domain are valid. When the partition and the prefix length for the domain are determined to be valid, the APM device may create the requested domain. In some implementations, the network device may create the requested domain when the partition and the prefix length are valid for the requested domain.

As further shown in FIG. 1C, and by reference number 124, the network device may receive, from the APM device, an RPC response indicating that the requested domain is created and including threshold values for the requested domain. For example, after the APM device creates the requested domain, the APM device may define the threshold values for the requested domain and may generate the RPC response indicating that the requested domain is created and including the threshold values for the requested domain. The APM device may provide RPC response to the network device, and the network device may receive the RPC response. In some implementations, if the APM device is unable to create the requested domain, the APM device may provide, to the network device, an RPC error response indicating that the requested domain could not be created. In some implementations, the APM device may receive, from the network device, an RPC response indicating that the requested domain is created and including threshold values for the requested domain. For example, after the network device creates the requested domain, the network device may define the threshold values for the requested domain and may generate the RPC response indicating that the requested domain is created and including the threshold values for the requested domain.

As further shown in FIG. 1C, and by reference number 126, the network device may provide, to the APM device, an apportionment RPC alarm for a particular domain when a quantity of addresses in the particular domain is less than or equal to an apportionment threshold. For example, the network device may generate the apportionment RPC alarm for the particular domain when a quantity of available addresses in the particular domain is equal to or less than the apportionment threshold. The apportionment RPC alarm may include a name of the particular domain, an alarm set to apportionment, and available addresses in the particular domain at the time the apportionment RPC alarm is generated. The network device may provide the apportionment RPC alarm to the APM device. In some implementations, the APM device may provide, to the network device, an apportionment RPC alarm for a particular domain when a quantity of addresses in the particular domain is less than or equal to an apportionment threshold.

As further shown in FIG. 1C, and by reference number 128, the APM device may populate the particular domain with one or more address pools. For example, if the apportionment is successful (e.g., a pool prefix is allocated), the APM device may populate the particular domain with one or more address pools. If the apportionment is unsuccessful (e.g., due to a partition depletion), the APM device may determine a timestamp value indicating when the network device should retry the apportionment RPC alarm. In some implementations, the network device may populate the particular domain with one or more address pools. For example, if the apportionment is successful (e.g., a pool prefix is allocated), the network device may populate the particular domain with one or more address pools.

As further shown in FIG. 1C, and by reference number 130, the network device may receive, from the APM device, an apportionment alarm RPC response indicating that the particular domain has been populated with the one or more address pools. For example, after the APM device populates the particular domain with the one or more address pools, the APM device may generate the apportionment alarm RPC response indicating that the particular domain has been populated with the one or more address pools. An acknowledgment field of the apportionment alarm RPC response may be set to acknowledged to indicate that the particular domain has been populated with the one or more address pools. An operation field of the apportionment alarm RPC response may be set to add pool, and a pool information field of the apportionment alarm RPC response may be populated with the one or more address pools. In some implementations, the network device may populate the particular domain with the one or more address pools based on the apportionment alarm RPC response. In some implementations, the APM device may receive, from the network device, an apportionment alarm RPC response indicating that the particular domain has been populated with the one or more address pools.

If the apportionment is unsuccessful, an acknowledgment field of the apportionment alarm RPC response may be set to not acknowledged, a value of a retry time field of the apportionment alarm RPC response may be set to a timestamp value (e.g., in minutes, hours, and/or the like) to indicate when the network device should retry the apportionment RPC alarm. The network device may retry the apportionment RPC alarm after expiration of the timestamp value.

As shown in FIG. 1D, and by reference number 132, the network device may provide, to the APM device, a reclamation RPC alarm for a particular domain when a quantity of addresses in the particular domain exceeds a reclamation threshold. For example, the network device may begin a reclamation process by generating a reclamation RPC alarm for a particular domain when a quantity of addresses in the particular domain exceeds a reclamation threshold. The reclamation RPC alarm may include a name of the particular domain, an alarm field set to reclamation, an available addresses field set to the quantity of addresses of the particular domain at a time the reclamation RPC alarm is generated, and a pool name field set to a suggested name of a pool in the particular domain. The network device may provide the reclamation RPC alarm to the APM device. In some implementations, the APM device may provide, to the network device, a reclamation RPC alarm for a particular domain when a quantity of addresses in the particular domain exceeds a reclamation threshold.

As further shown in FIG. 1D, and by reference number 134, the APM device may identify a particular address pool in the particular domain based on the reclamation RPC alarm. For example, the APM device may identify the particular domain and the particular address pool to determine whether the particular domain and the particular address pool are valid (e.g., allocated to the network device). The APM device may also determine whether automatic reclamation is active by determining whether automatic reclamation is enabled and within a configured reclamation window. In some implementations, the network device may identify a particular address pool in the particular domain based on the reclamation RPC alarm. For example, the network device may identify the particular domain and the particular address pool to determine whether the particular domain and the particular address pool are valid.

As further shown in FIG. 1D, and by reference number 136, the network device may receive, from the APM device, a first reclamation RPC alarm response instructing the network device to drain the particular address pool. For example, if the particular domain and the particular address pool are valid and automatic reclamation is active, the APM device may generate the first reclamation RPC alarm response. The first reclamation RPC alarm response may include an acknowledgement field set to acknowledged, an operation field set to drain pool, and a pool information field that includes the particular domain name and the particular address pool name to be drained. If the reclamation request cannot be honored (e.g., either because the particular domain and the particular address pool are invalid, automatic reclamation is disabled, or automatic reclamation is outside the configured reclamation window), the APM device may generate and provide to the network device a first reclamation RPC alarm response that includes the acknowledgement field set to not acknowledged, the operation field set to no operation, and a retry time field set to a timestamp value. If the particular domain and the particular address pool are invalid or the automatic reclamation is disabled, the retry time field may be set to zero (e.g., never). If the automatic reclamation is outside the configured reclamation window, the retry time field may be set to a beginning of a next reclamation window (e.g., a timestamp value). If automatic reclamation is disabled and then reenabled, the APM device may inform the network device of the change in automatic reclamation state. The network device may retry the reclamation RPC alarm after expiration of the timestamp value. In some implementations, the APM device may receive, from the network device, a first reclamation RPC alarm response instructing the APM device to drain the particular address pool.

As further shown in FIG. 1D, and by reference number 138, the network device may drain the particular address pool based on the first reclamation alarm RPC response. For example, if the first reclamation RPC alarm response includes the acknowledgement field set to acknowledged, the operation field set to drain pool, and the pool information field, the network device may drain the particular address pool based on the first reclamation alarm RPC response. If the first reclamation RPC alarm response includes the acknowledgement field set to not acknowledged, the operation field set to no operation, and the retry time field set to the timestamp value, the network device may not drain the particular address pool and may retry the reclamation RPC alarm after expiration of the timestamp value. In some implementations, the APM device may drain the particular address pool based on the first reclamation alarm RPC response.

As further shown in FIG. 1D, and by reference number 140, the network device may provide, to the APM device, a pool drain RPC response indicating that the particular address pool has been drained. For example, the network device may generate the pool drain RPC response when the particular address pool to be drained (e.g., as indicated in the first reclamation RPC alarm response) completes draining (e.g., no allocated addresses in the particular address pool). The network device may provide the pool drain RPC response to the APM device. In some implementations, the APM device may provide, to the network device, a pool drain RPC response indicating that the particular address pool has been drained.

As further shown in FIG. 1D, and by reference number 142, the network device may receive, from the APM device, a second reclamation alarm RPC response instructing the network device to delete the particular address pool. For example, upon receipt of the pool drain RPC response, APM device may generate the second reclamation alarm RPC response. The second reclamation alarm RPC response may include an acknowledgement field set to acknowledged, an operation field set to delete pool, and a pool information field that includes the particular domain name and the particular address pool name set to the address pool to be deleted. The APM device may provide the second reclamation alarm RPC response to the network device. In some implementations, the APM device may receive, from the network device, a second reclamation alarm RPC response instructing the APM device to delete the particular address pool.

As further shown in FIG. 1D, and by reference number 144, the network device may delete the particular address pool based on the second reclamation alarm RPC response.

For example, the network device may receive the second reclamation alarm RPC response instructing the network device to delete the particular address pool, and may remove the particular address pool based on the second reclamation alarm RPC response. In some implementations, the APM device may delete the particular address pool based on the second reclamation alarm RPC response.

As further shown in FIG. 1D, and by reference number 146, the APM device may remove the particular address pool and deallocate an associated pool prefix based on sending the second reclamation alarm RPC response to the network device. In some implementations, the network device may remove the particular address pool and deallocate an associated pool prefix based on sending the second reclamation alarm RPC response to the APM device.

As shown in FIG. 1E, and by reference number 148, the network device may receive, from the APM device, a domain statistics RPC request. For example, when the APM device requires domain statistics, the APM device may generate the domain statistics request. The domain statistics request may include an action field set to send pool domain statistics, a domain name field set to a pool domain, and an information field set to null. The APM device may provide the domain statistic RPC request to the network device. In some implementations, the APM device may receive, from the network device, a domain statistics RPC request.

As further shown in FIG. 1E, and by reference number 150, the network device may provide, to the APM device, a domain statistics RPC response based on the domain statistics RPC request. For example, the network device may retrieve the domain statistics requested by domain RPC statistics request, and may generate the domain statistics RPC response after retrieving the domain statistics. The domain statistics RPC response may include current values of the domain statistics. The network device may provide the domain statistics RPC response to the APM device. In some implementations, the APM device may provide, to the network device, a domain statistics RPC response based on the domain statistics RPC request.

As further shown in FIG. 1E, and by reference number 152, the network device may receive, from the APM device, a threshold update RPC request. For example, when the APM device needs to update domain thresholds (e.g., a configuration change), the APM device may generate the threshold update RPC request. The threshold update RPC request may include an action field set to update pool domain thresholds, a domain name field set to a pool domain, and an information field set to null. The APM device may provide the threshold update RPC request to the network device. In some implementations, the APM device may receive, from the network device, a threshold update RPC request.

As further shown in FIG. 1E, and by reference number 154, the network device may update the domain thresholds based on the threshold update RPC request. For example, based on the threshold update RPC request, the network device may generate a modify domain RPC request for current values of the domain thresholds. The modify domain RPC request may include an operation field set to modify and a pool domain name set to the name of the domain. The network device may update the domain thresholds based on execution of the modify domain RPC request. In some implementations, the APM device may update the domain thresholds based on the threshold update RPC request.

As further shown in FIG. 1E, and by reference number 156, the network device may provide, to the APM device, a threshold update RPC response indicating that the domain thresholds have been updated. For example, once the network device updates the domain thresholds, the network device may generate the threshold update RPC response indicating that the domain thresholds have been updated. The network device may provide the threshold update RPC response to the APM device. In some implementations, the APM device may provide, to the network device, a threshold update RPC response indicating that the domain thresholds have been updated.

Figure 1F:
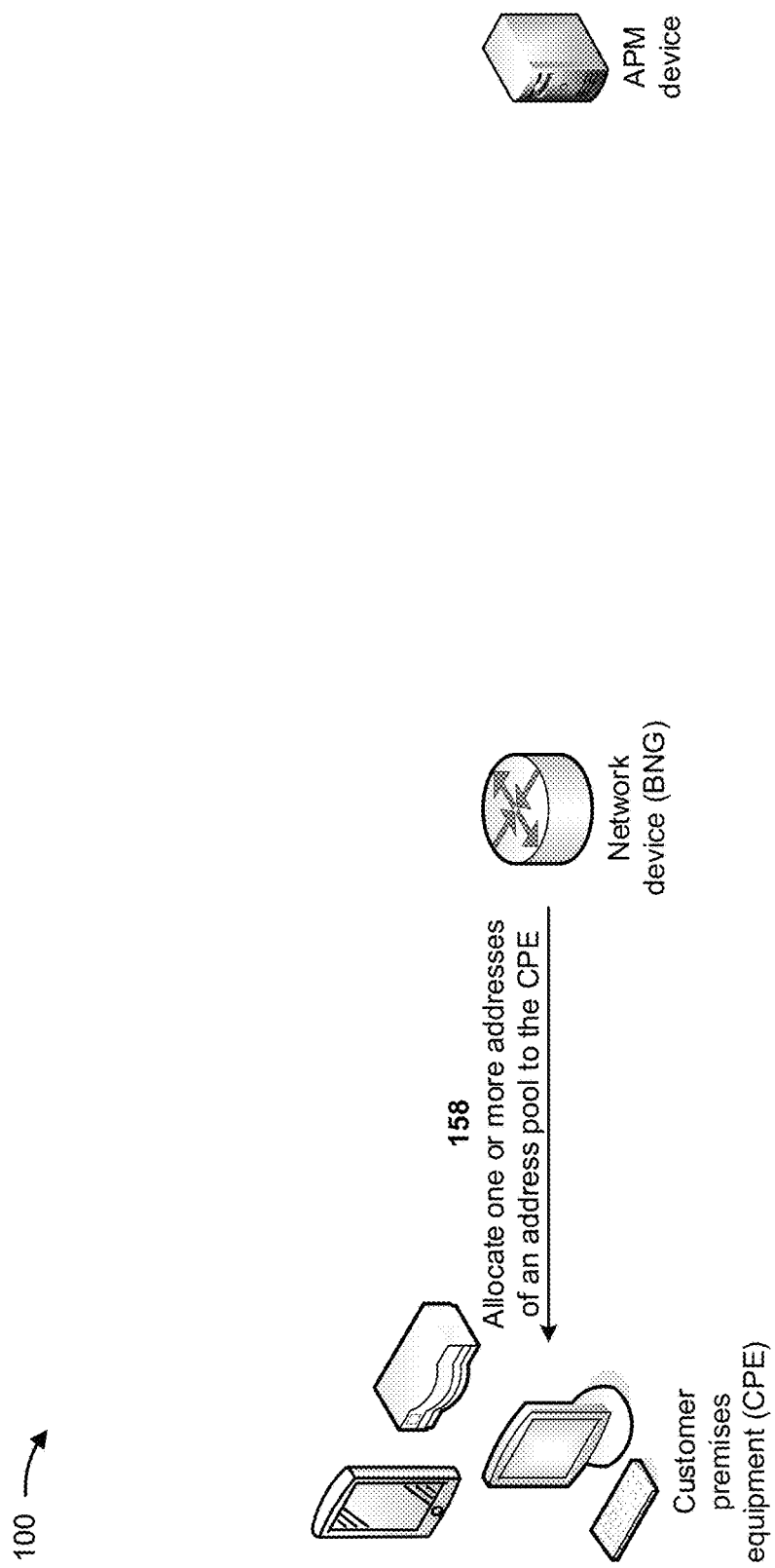

As shown in FIG. 1F, and by reference number 158, the network device may allocate one or more addresses of an address pool to the CPE. For example, the network device may dynamically assign public IP addresses to the CPE in order for customer traffic to be routed to public destinations. In some implementations, the APM device may allocate one or more addresses of an address pool to the CPE.

In some implementations, the APM device may be utilized for manual reclamation. Manual reclamation may include an operation driven by the APM device where an operator of the APM device may selectively drain and reclaim a pool from the network device. Upon receiving a request to drain a pool of a domain, the APM device may generate and provide, to the network device, a reclamation RPC message that includes an action field set to manual reclamation drain, a domain name field set to the domain, and a pool information field that includes a name of the pool to drain in the domain. The network device may receive the reclamation RPC message and may drain the pool based on the reclamation RPC message. Once the pool is drained, the network device may generate and provide, to the APM device, a pool drained RPC alarm. In response to the pool drained RPC alarm, the APM device may provide, to the network device, an alarm RPC response that includes an operation field set to no operation, an acknowledgement field set to acknowledged, and a pool information field set to the domain name and the name of the pool that was drained. The APM device may provide, to the network device, a reclaim RPC request for the drained pool. The reclaim RPC request may include an action field set to manual reclamation delete, a domain name field set to the domain, and a pool name field set to the name of the pool to delete. The network device may delete the pool based on the reclaim RPC request. The APM device may delete the pool and/or deallocate an associated prefix when the network device confirms deletion of the pool (e.g., via a pool deleted alarm).

In some implementations, the network device may be a server and the APM device may be a client. In such implementations, the APM device may be configured with transport information for each network device BNG for which the APM device manages address pools. The APM device may initiate a connection with the network device, and the network device may accept connection. The APM device may initiate a connection check, and the network device may respond to the connection check. The APM device may initiates a sync domains (e.g., a set of synchronized domains that include a union of domains that the network device and the APM device exchange). The APM device may initiate pool synchronization for each domain in the synchronized set of domains (e.g., a set of pools for a domain that includes a union of the pools that the network device and the APM device exchange). The APM device may provide a sync complete request to the network device when all domain pools have been synchronized, and the network device may acknowledge with a response. The network device may create a domain by providing a modify domain message on a stream to the APM device. The APM device may create a pool domain, may allocate a first pool prefix, and may initiate an add pool request to the network device. The network device may add the pool and may acknowledge with a response. The network device may provide an alarm message on a stream, to the APM device, to raise an apportion alarm. The APM device may allocate a prefix and provide an add pool request to the network device, The network device may add the pool to the domain and may acknowledge with a response. The network device may provide, to the APM device, an alarm message on a stream to raise a reclamation alarm. The APM device may request a pool drain from the network, and the network device may begin to drain a pool and may acknowledge with a response. When the pool completes draining, the network device may provide to the APM device, an alarm message on a stream to raise a pool-drained alarm. The APM device may request a pool delete from the network, and the network device may delete the pool and may acknowledge with a response. Upon receipt of the response, the APM device may deallocate the pool prefix back to a domain partition. The APM device may provide a statistics request to the network device for domain statistics. The network device may collect domain and associated pool statistics and may return the statistics in response to APM device. The APM device may updates domain threshold by providing a domain update request to the network device with new threshold values. The network device may update the domain thresholds and may acknowledge with a response. Upon an operator command to drain a pool, the APM device may initiate a manual reclamation by sending a drain pool request to network device. The network device may start a drain on a pool and may acknowledge with a response. The operator may cancel a drain on a pool through a command. The APM device may initiate a cancel drain on a pool by sending a cancel drain request to the network device. The network device may remove the drain and may acknowledge with a response. When a pool is drained, the network device may provide a pool drained alarm to the APM device. An operator may issue a command to reclaim the pool. The APM device may initiate a delete pool request. The network device may delete the pool and may acknowledge with a response. The APM device may deallocate the pool prefix back to a domain partition.

In some implementations, the APM device is a server and the network device is a client. In such implementations, the network device may be configured with transport information for the APM device as well as a system identifier to identify the network device to the APM device. The network device may initiate a connection with the APM device, and the APM device may accept a connection for unique system identifiers. The network device may initiate a connection check, and the APM device may respond to the connection check. The network device may initiate a sync domains (e.g., a set of synchronized domains presented by the network device). The APM device may remove any domains and may deallocate any associated pool prefixes for domains not presented by network device. The network device may initiate a pool synchronization for each domain in the synchronized set of domains (e.g., a set of pools for a domain is a set of the pools that the network device presents). The APM device may attempt to allocate the pool prefixes and may deallocate any pool prefixes not presented by the network device. If the APM device cannot allocate any pool prefixes, the APM device may return a set of prefixes that could not be allocated in a pool synch response. The network device may drain and delete such pools. The network device may create a domain by providing a modify domain request to the APM device. The APM device may create a pool domain and may respond with domain threshold values. The network device may provide, to the APM device, an alarm request to raise an apportion alarm. The APM device may allocate a prefix and may respond with an add pool action to the network device. The network device may add the pool to the domain. The network device may provide, to the APM device, an alarm request to raise a reclamation alarm. The APM device may respond with a pool drain action to the network device. The network device may start to drain a pool. When the pool completes draining, the network device may provide, to the APM device, an alarm request to raise a pool-drained alarm. The APM device may respond with a delete action to the network device and may deallocate the pool prefix back to a domain partition. The APM device may provide a trigger response (on an open trigger request) to trigger the network device to send domain statistics. The network device may provide a statistics request with domain statistics. The APM device may acknowledges receipt of the domain statistics. The APM device may notify the network device of updates to domain thresholds by providing a trigger response (on an open trigger request) to trigger the network device to update domain threshold information. The network device may update associated threshold values for the domain. Upon an operator command to drain a pool, the APM device may initiate a manual reclamation by providing a trigger response (on an open trigger request) to trigger the network device to begin manual reclamation by draining a pool. The operator may cancel a drain on a pool through a command. The APM device may initiate a cancel drain on a pool by providing a sending a trigger response (on an open trigger request) to trigger the network device to remove the drain on a pool. When a pool is drained, the network device may provide a pool drained alarm request to APM device. The APM device may acknowledge the pool drain request. The operator may issue a command to reclaim the pool. The APM device may delete the pool by providing a trigger response (on an open trigger request) to trigger the network device to delete the pool. The APM device may deallocate the pool prefix back to a domain partition. The network device may delete the pool. The APM device may notify the network device of changes to the auto-reclamation behavior by providing a trigger response (on an open trigger request) to trigger the network device to take note of the change in auto-reclamation behavior.

In this way, the network device provides a network device interface for supporting centralized address pool management. For example, a network device (e.g., a provider edge device) may include an RPC-based interface that provisions address pool prefixes directly into an address allocator of the network device. The RPC-based interface may enable sub-second provisioning of address pool prefixes for the network device and may subsequently allow a size of an address pool prefix (e.g., in terms of a quantity of host addresses) to be smaller. Thus, the network device conserves computing resources, networking resources, and/or that like that would otherwise have been consumed by delaying traffic transmission through a network slow address allocation, losing traffic due to slow address allocation, handling lost traffic caused by slow address allocation, preventing traffic transmission by customers, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
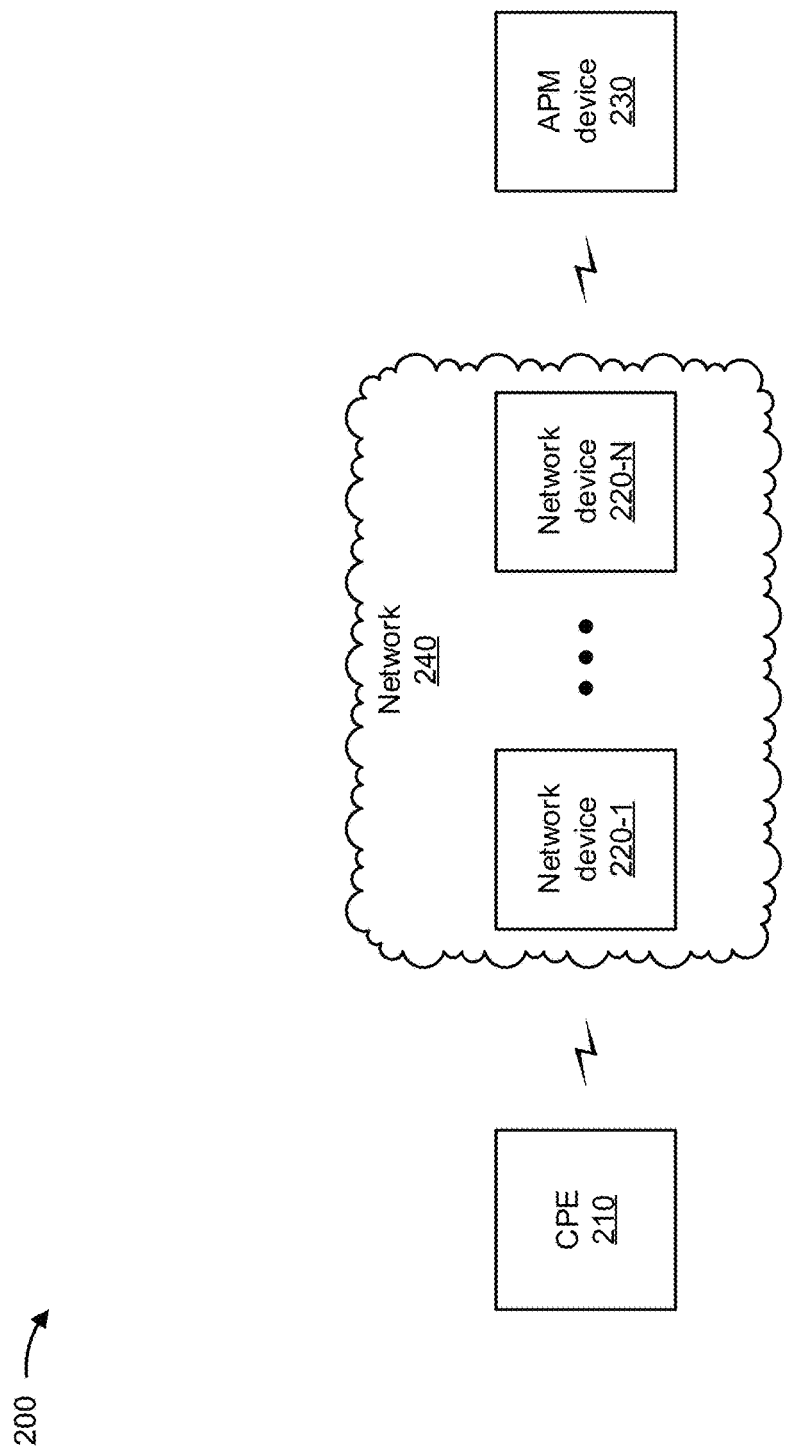
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an CPE 210, a group of network devices 220 (shown as network device 220-1 through network device 220-N), an APM device 230, and a network 240. Devices of the environment 200 may interconnect via wired connections, wireless connections, or a combination of wired and wireless connections.

The CPE 210 includes one or more devices capable of receiving, generating, storing, processing, and/or providing information, such as information described herein. For example, the CPE 210 may include a mobile phone (e.g., a smart phone or a radiotelephone), a set-top box, a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device (e.g., a router, a residential gateway, and/or the like), or a similar type of device. In some implementations, the CPE 210 may receive network traffic from and/or may provide network traffic to other CPE 210 and/or the APM device 230, via the network 240 (e.g., by routing packets using the network devices 220 as intermediaries).

The network device 220 includes one or more devices capable of receiving, processing, storing, routing, and/or providing traffic (e.g., a packet or other information or metadata) in a manner described herein. For example, the network device 220 may include a router, such as a label switching router (LSR), a label edge router (LER), an ingress router, an egress router, a provider router (e.g., a provider edge router or a provider core router), a virtual router, a route reflector, an area border router, or another type of router. Additionally, or alternatively, the network device 220 may include a gateway, a switch, a firewall, a hub, a bridge, a reverse proxy, a server (e.g., a proxy server, a cloud server, or a data center server), a load balancer, and/or a similar device. In some implementations, the network device 220 may be a physical device implemented within a housing, such as a chassis. In some implementations, the network device 220 may be a virtual device implemented by one or more computer devices of a cloud computing environment or a data center. In some implementations, a group of network devices 220 may be a group of data center nodes that are used to route traffic flow through the network 240.

The APM device 230 includes one or more devices capable of receiving, generating, storing, processing, and/or providing information, such as information described herein. For example, the APM device 230 may include a laptop computer, a tablet computer, a desktop computer, a group of server devices, or a similar type of device. In some implementations, the APM device 230 may receive information from and/or transmit information to the CPE 210, via the network 240 (e.g., by routing packets using the network devices 220 as intermediaries).

The network 240 includes one or more wired and/or wireless networks. For example, the network 240 may include a packet switched network, a cellular network (e.g., a fifth generation (5G) network, a fourth generation (4G) network, such as a long-term evolution (LTE) network, a third generation (3G) network, and/or the like), a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
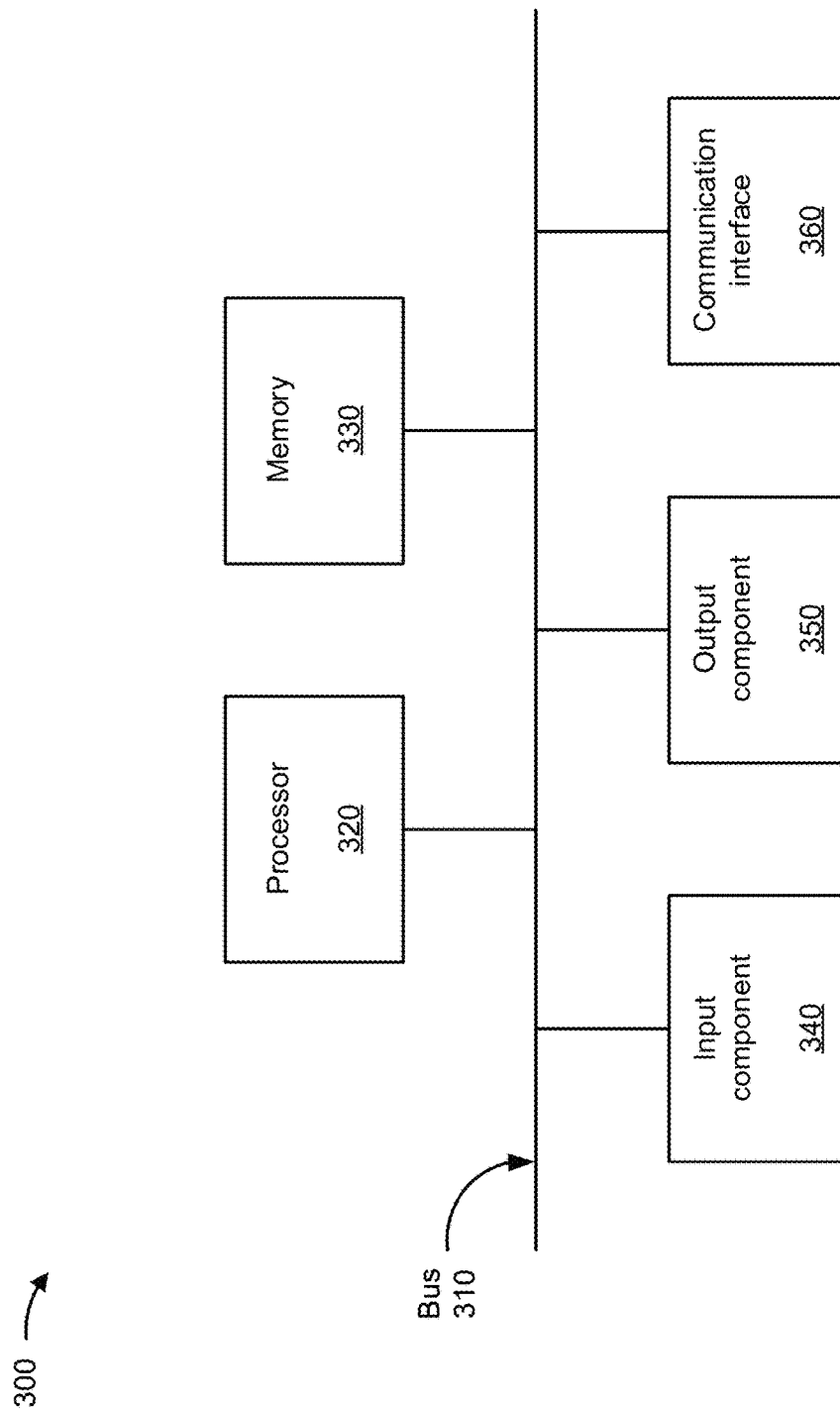
FIGS. 3 and 4 are diagrams of example components of one or more devices of FIG. 2.

FIG. 3 is a diagram of example components of one or more devices of FIG. 2. The example components may be included in a device 300, which may correspond to the CPE 210, the network device 220, and/or the APM device 230. In some implementations, the CPE 210, the network device 220, and/or the APM device 230 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hard-wired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
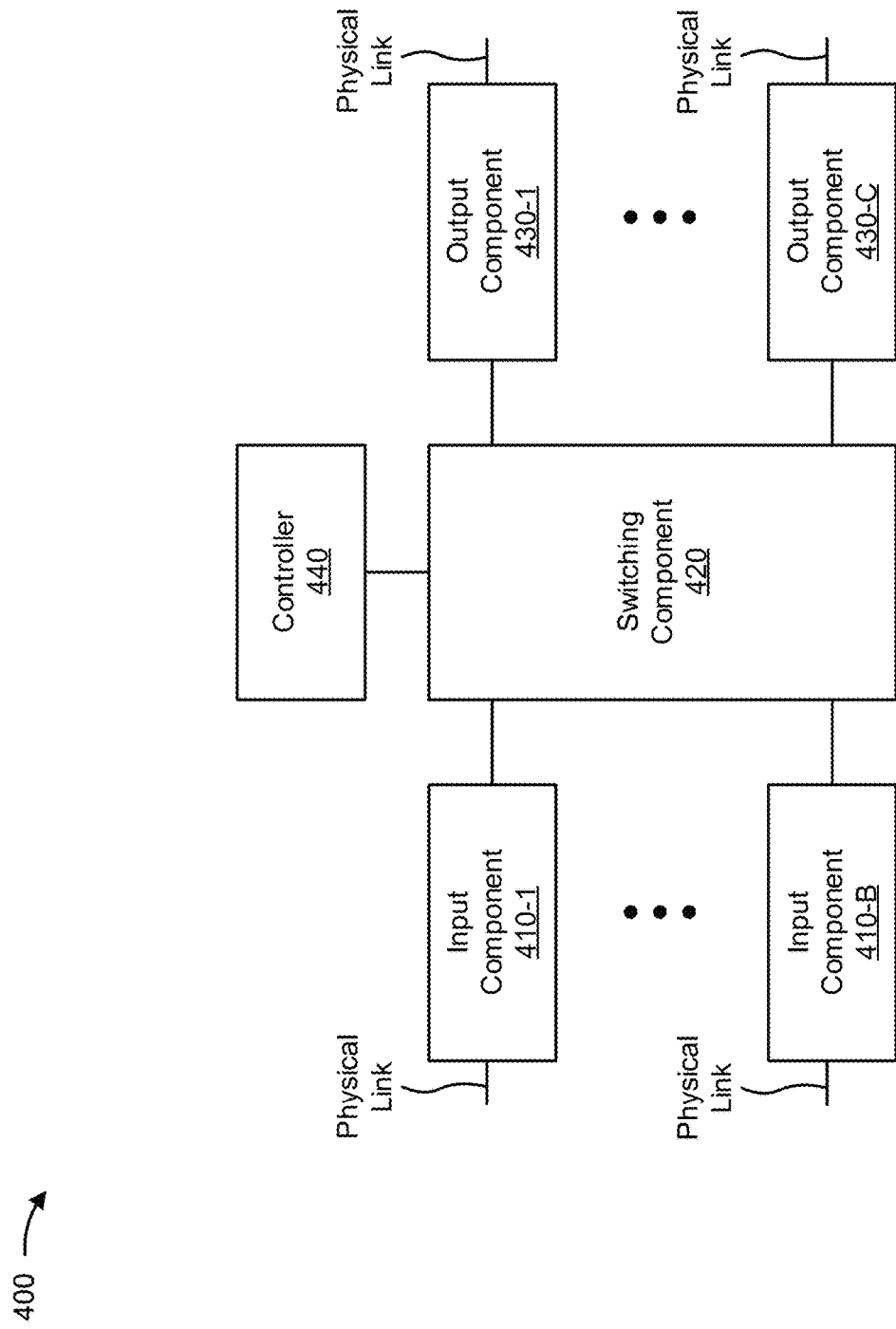

FIG. 4 is a diagram of example components of one or more devices of FIG. 2. The example components may be included in a device 400. The device 400 may correspond to the network device 220. In some implementations, the network device 220 may include one or more devices 400 and/or one or more components of the device 400. As shown in FIG. 4, the device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 440 from another computer-readable medium or from another device via a communication interface. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 for providing a network device interface for supporting centralized address pool management. In some implementations, one or more process blocks of FIG. 5 may be performed by a first device (e.g., the network device 220). In some implementations, one or more process blocks of FIG. 5 may be performed by another device or a group of devices separate from or including the network device, such as a CPE (e.g., the CPE 210) and/or a second device (e.g., the APM device 230). Additionally, or alternatively, one or more process blocks of FIG. 5 may be performed by one or more components of the device 300, such as the processor 320, the memory 330, the input component 340, the output component 350, and/or the communication interface 360. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include establishing a connection with a second device (block 510). For example, the first device may establish a connection with a second device, as described above. In some implementations, the first device is a broadband network gateway associated with a plurality of customer premises equipment. In some implementations, the first device includes an RPC interface communicating with the second device.

As further shown in FIG. 5, process 500 may include providing a connection check RPC message to the second device based on establishing the connection (block 520). For example, the first device may provide a connection check RPC message to the second device based on establishing the connection, as described above.

As further shown in FIG. 5, process 500 may include receiving a verification RPC message from the second device based on the connection check RPC message (block 530). For example, the first device may receive a verification RPC message from the second device based on the connection check RPC message, as described above.

As further shown in FIG. 5, process 500 may include providing, to the second device, a sync domains RPC request that includes a first list of active domains with associated address pools identified by the first device (block 540). For example, the first device may provide, to the second device, a sync domains RPC request that includes a first list of active domains with associated address pools identified by the first device, as described above.

As further shown in FIG. 5, process 500 may include receiving from the second device, and based on the sync domains RPC request, a sync domains RPC response that includes threshold values for the active domains included in the first list of active domains (block 550). For example, the first device may receive from the second device, and based on the sync domains RPC request, a sync domains RPC response that includes threshold values for the active domains included in the first list of active domains, as described above. In some implementations, the sync domains RPC response is received based on the second device reconciling the first list of active domains with a second list of active domains identified by the second device.

As further shown in FIG. 5, process 500 may include providing, to the second device, a sync pools RPC request that includes a first list of address pools identified by the first device and associated with the active domains (block 560). For example, the first device may provide, to the second device, a sync pools RPC request that includes a first list of address pools identified by the first device and associated with the active domains, as described above.

As further shown in FIG. 5, process 500 may include receiving from the second device, and based on the sync pools RPC request, a sync pools RPC response that includes confirmation of the first list of address pools (block 570). For example, the first device may receive from the second device, and based on the sync pools RPC request, a sync pools RPC response that includes confirmation of the first list of address pools, as described above. In some implementations, the sync pools RPC response is received based on the second device reconciling the first list of address pools with a second list of address pools identified by the second device.

As further shown in FIG. 5, process 500 may include allocating one or more addresses of an address pool of the first list of address pools to customer premises equipment (block 580). For example, the first device may allocate one or more addresses of an address pool of the first list of address pools to customer premises equipment, as described above.

In some implementations, process 500 includes providing, to the second device, a domain creation RPC request that includes a partition, a prefix length, and a name for a requested domain, and receiving, from the second device, an RPC response indicating that the requested domain is created and including threshold values for the requested domain. In some implementations, the requested domain is created based on the second device determining that the partition and the prefix length are valid.

In some implementations, process 500 includes providing, to the second device, an apportionment RPC alarm for a particular domain when a quantity of addresses in the particular domain is less than or equal to an apportionment threshold, and receiving, from the second device, an apportionment alarm RPC response indicating that the particular domain has been populated with at least one address pool. In some implementations, the second device generates the apportionment alarm RPC response based on populating the particular domain with the at least one address pool.

In some implementations, process 500 includes receiving, from the second device, a domain statistics RPC request, and providing, to the second device, a domain statistics RPC response based on the domain statistics RPC request.

In some implementations, process 500 includes receiving, from the second device, a threshold update RPC request; updating domain thresholds based on the threshold update request; and providing, to the second device, a threshold update RPC response indicating that the domain thresholds have been updated.

In some implementations, process 500 includes providing, to the second device, a reclamation RPC alarm for a particular domain when a quantity of addresses in the particular domain exceeds a reclamation threshold; receiving, from the second device, a first reclamation RPC alarm response instructing the first device to drain a particular address pool in the particular domain, draining the particular address pool based on the first reclamation alarm RPC response; and providing, to the second device, a pool drain RPC response indicating that the particular address pool has been drained. In some implementations, process 500 includes receiving, from the second device, a second reclamation alarm RPC response instructing the first device to delete the particular address pool, and deleting the particular address pool based on the second reclamation alarm RPC response.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    establishing, by a first device, a connection with a second device;
    providing, by the first device, a connection check remote procedure call (RPC) message to the second device based on establishing the connection;
    receiving, by the first device, a verification RPC message from the second device based on the connection check RPC message;
    providing, by the first device and to the second device, a sync domains RPC request that includes a first list of active domains with associated address pools identified by the first device;
    receiving, by the first device, from the second device, and based on the sync domains RPC request, a sync domains RPC response that includes threshold values for the active domains included in the first list of active domains;
    providing, by the first device and to the second device, a sync pools RPC request that includes a first list of address pools identified by the first device and associated with the active domains;
    receiving, by the first device, from the second device, and based on the sync pools RPC request, a sync pools RPC response that includes confirmation of the first list of address pools;
    allocating, by the first device, one or more addresses of an address pool of the first list of address pools to customer premises equipment;
    providing, to the second device, a domain creation RPC request that includes a partition, a prefix length, and a name for a requested domain; and
    receiving, from the second device, an RPC response indicating that the requested domain is created and including threshold values for the requested domain.

2. The method of claim 1, wherein the sync domains RPC response is received based on the second device reconciling the first list of active domains with a second list of active domains identified by the second device.

3. The method of claim 1, wherein the sync pools RPC response is received based on the second device reconciling the first list of address pools with a second list of address pools identified by the second device.

4. The method of claim 1, wherein the requested domain is created based on the second device determining that the partition and the prefix length are valid.

5. The method of claim 1, further comprising:
    providing, to the second device, an apportionment RPC alarm for a particular domain when a quantity of addresses in the particular domain is less than or equal to an apportionment threshold; and receiving, from the second device, an apportionment alarm RPC response indicating that the particular domain has been populated with at least one address pool.

6. The method of claim 5, wherein the second device generates the apportionment alarm RPC response based on populating the particular domain with the at least one address pool.

7. The method of claim 1, wherein the second device includes an address pool management (APM) device.

8. A first device, comprising:
one or more memories; and
one or more processors to:
establish a connection with a second device;
provide a connection check remote procedure call (RPC) message to the second device based on establishing the connection;
receive a verification RPC message from the second device based on the connection check RPC message;
provide, to the second device, a sync domains RPC request that includes a first list of active domains with associated address pools identified by the first device;
receive from the second device, and based on the sync domains RPC request, a sync domains RPC response that includes threshold values for the active domains included in the first list of active domains;
provide, to the second device, a sync pools RPC request that includes a first list of address pools identified by the first device and associated with the active domains;
receive from the second device, and based on the sync pools RPC request, a sync pools RPC response that includes confirmation of the first list of address pools;
provide, to the second device, a domain creation RPC request that includes a partition, a prefix length, and a name for a requested domain; and
receive, from the second device, an RPC response indicating that the requested domain is created and including threshold values for the requested domain.

9. The first device of claim 8, wherein the one or more processors are further to:
receive, from the second device, a domain statistics RPC request; and
provide, to the second device, a domain statistics RPC response based on the domain statistics RPC request.

10. The first device of claim 8, wherein the one or more processors are further to:
receive, from the second device, a threshold update RPC request;
update domain thresholds based on the threshold update request; and
provide, to the second device, a threshold update RPC response indicating that the domain thresholds have been updated.

11. The first device of claim 8, wherein the one or more processors are further to:
provide, to the second device, a reclamation RPC alarm for a particular domain when a quantity of addresses in the particular domain exceeds a reclamation threshold;
receive, from the second device, a first reclamation RPC alarm response instructing the first device to drain a particular address pool in the particular domain;
drain the particular address pool based on the first reclamation alarm RPC response; and provide, to the second device, a pool drain RPC response indicating that the particular address pool has been drained.

12. The first device of claim 11, wherein the one or more processors are further to:
receive, from the second device, a second reclamation alarm RPC response instructing the first device to delete the particular address pool; and
delete the particular address pool based on the second reclamation alarm RPC response.

13. The first device of claim 8, wherein the first device is a broadband network gateway associated with a plurality of customer premises equipment.

14. The first device of claim 8, wherein the first device includes an RPC interface communicating with the second device.

15. A non-transitory computer-readable medium storing a set of instructions, the set of instructions comprising:
one or more instructions that, when executed by one or more processors of a first device, cause the first device to:
establish a connection with a second device;
provide a connection check remote procedure call (RPC) message to the second device based on establishing the connection;
receive a verification RPC message from the second device based on the connection check RPC message;
provide, to the second device, a sync domains RPC request that includes a first list of active domains with associated address pools identified by the first device;
receive from the second device, and based on the sync domains RPC request, a sync domains RPC response that includes threshold values for the active domains included in the first list of active domains,
wherein the sync domains RPC response is received based on the second device reconciling the first list of active domains with a second list of active domains identified by the second device;
provide, to the second device, a sync pools RPC request that includes a first list of address pools identified by the first device and associated with the active domains;
receive from the second device, and based on the sync pools RPC request, a sync pools RPC response that includes confirmation of the first list of address pools,
wherein the sync pools RPC response is received based on the second device reconciling the first list of address pools with a second list of address pools identified by the second device;
allocate one or more addresses of an address pool of the first list of address pools to customer premises equipment;
provide, to the second device, a domain creation RPC request that includes a partition, a prefix length, and a name for a requested domain; and
receive, from the second device, an RPC response indicating that the requested domain is created and including threshold values for the requested domain.

16. The non-transitory computer-readable medium of claim 15, wherein the one or more instructions further cause the first device to:
provide, to the second device, an apportionment RPC alarm for a particular domain when a quantity of addresses in the particular domain is less than or equal to an apportionment threshold; and receive, from the second device, an apportionment alarm RPC response indicating that the particular domain has been populated with at least one address pool.

17. The non-transitory computer-readable medium of claim 15, wherein the one or more instructions further cause the first device to:
   receive, from the second device, a domain statistics RPC request; and
   provide, to the second device, a domain statistics RPC response based on the domain statistics RPC request.

18. The non-transitory computer-readable medium of claim 15, wherein the one or more instructions further cause the first device to:
   receive, from the second device, a threshold update RPC request;
   update domain thresholds based on the threshold update request; and
   provide, to the second device, a threshold update RPC response indicating that the domain thresholds have been updated.

19. The non-transitory computer-readable medium of claim 15, wherein the one or more instructions further cause the first device to:
   provide, to the second device, a reclamation RPC alarm for a particular domain when a quantity of addresses in the particular domain exceeds a reclamation threshold;
   receive, from the second device, a first reclamation RPC alarm response instructing the first device to drain a particular address pool in the particular domain;
   drain the particular address pool based on the first reclamation alarm RPC response;
   provide, to the second device, a pool drain RPC response indicating that the particular address pool has been drained;
   receive, from the second device, a second reclamation alarm RPC response instructing the first device to delete the particular address pool; and
   delete the particular address pool based on the second reclamation alarm RPC response.

20. The non-transitory computer-readable medium of claim 15, wherein the first device includes a provider edge device.

* * * * *